United States Patent [19]
Winkler

[11] 3,880,917
[45] Apr. 29, 1975

[54] 2-OXO-3,4-BENZOBICYCLO-(3,3,1)-NONENE-(3) CARBOXYLIC ACIDS-8 THEREOF AND PROCESS THEREFOR

[75] Inventor: Adolf Winkler, Leverkusen, Germany

[73] Assignee: Bayer Aktiengesellschaft, Leverkusen, Germany

[22] Filed: May 9, 1973

[21] Appl. No.: 358,788

[30] Foreign Application Priority Data
May 12, 1972 Germany............................ 2223127

[52] U.S. Cl.............. 260/515 R; 260/590; 424/522
[51] Int. Cl......................... C07c 63/00; C07c 63/42
[58] Field of Search .................................. 260/515 R

[56] References Cited
OTHER PUBLICATIONS
J. Chem. Soc. (1956), pp. 1809–1812.
Ber., Vol. 98 (1965), pp. 1270–1271.

*Primary Examiner*—James A. Patten
*Attorney, Agent, or Firm*—Burgess, Dinklage & Sprung

[57] ABSTRACT

2-oxo-3,4-benzo-bicyclo-[3,3,1]-nonene-(3) and cis- and trans-2-oxo-3,4-benzo-bicyclo-[3,3,1]-nonene-(3) carboxylic acid-8 are prepared by reacting $\Delta^3$-cyclohexene carboxylic acid or $\Delta^4$-tetrahydrophthalic acid anhydride with benzene in the presence of hydrogen fluoride in the temperature range of 75°C to 200°C.

18 Claims, No Drawings

2-OXO-3,4-BENZOBICYCLO-(3,3,1)-NONENE-(3) CARBOXYLIC ACIDS-8 THEREOF AND PROCESS THEREFOR

This invention relates to a process for the preparation 0f 2-oxo-3,4-benzo-bicyclo-[3,3,1]-nonene-(3) and its carboxylic acids-8 and new cis- and trans-2-oxo-3,4-benzo-bicyclo-[3,3,1]-nonene-(3)-carboxylic acids-8.

SUMMARY

It has been found that 2-oxo-3,4-benzo-bicyclo-[3,3,1]-nonene-(3) and cis- and trans-2-oxo-3,4-benzo-bicyclo-[3,3,1]-nonene-(3) carboxylic acid-8 are obtained when $\Delta^3$-cyclo hexenecarboxylic acid or $\Delta^4$-tetrahydrophthalic acid anhydride is reacted with benzene in the presence of hydrogen fluoride preferably at a temperature of between 75° and 200°C.

DESCRIPTION

The reaction is preferably carried out within the temperature range of 90°C to 175°C.

The temperature employed for the reaction of $\Delta^3$-cyclohexene carboxylic acid are generally at the lower end of the range specified above, preferably between 100°C and 150°C, whereas for the reaction of $\Delta^4$-tetrahydrophthalic acid anhydride higher temperatures, between 130°C and 160°C, are preferably used.

Of the starting materials, the more easily obtainable benzene is generally used in excess, preferably 2 to 5 times the stoichiometrically required quantity although there is no harm in using a larger excess.

The hydrogen fluoride used generally serves both as catalyst and as solvent. It is therefore used in an excess preferably of up to 30 or 50 mol, preferably in a quantity of 5 to 20 mol and in the particular about 10 mol, based on the starting material which is used in a less than equivalent quantity. However, the quantity of hydrogen fluoride used may be varied within wide limits without any deleterious effect on the reaction although the excess should generally not be less than 3 mol.

Aprotic organic solvents which do not react with the starting compounds under the conditions of the process according to the invention may also be used, for example nitrobenzene or chlorinated hydrocarbons. The benzene used in excess as starting material may also serve as solvent.

The reaction is generally carried out by heating the mixture of reactants to the selected reaction temperature and then keeping them at this temperature for some time. Owing to the volatility of hydrogen fluoride, it is generally advisable to carry out the reaction in a closed vessel at the pressure which is developed during the reaction, although a lower or higher pressure may also be used.

It is generally advisable to keep the reaction mixture at the reaction temperature for about 2 to 6 hours. If desired, the optimum reaction time may be determined by a few tests.

After termination of the reaction, the reaction product can generally easily be isolated by distilling off the hydrogen fluoride and excess benzene, and it may then be purified by known methods, e.g., by recrystallisation or chromatographic purification and, in the case of the carboxylic acids, also over salts.

The process according to the invention may be represented, for example, in the case of the reaction with benzene, by the following reaction scheme:

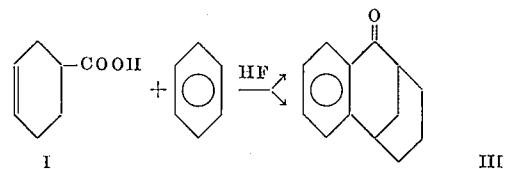

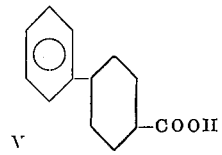

When the reaction is carried out with $\Delta^3$-cyclohexene carboxylic acid (I), 4-phenyl-cyclohexane carboxylic acid (V) is obtained as by-product which cannot be cyclised and can easily be removed due to the solubility of its alkali metal salts in water.

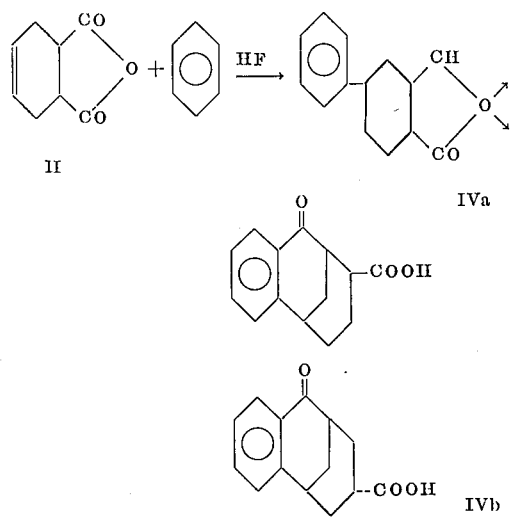

When the reaction is carried out with $\Delta^4$-tetrahydrophthalic acid anhydride (II), a mixture of the cis- and transisomers of 2-oxo-3,4-benzo-bicyclo-[3,3,1]-nonene-(3)-carboxylic acids-8 (IV a, IV b), is obtained which may be separated e.g. by crystallisation.

2-Oxo-3,4-benzo-bicyclo-[3,3,1]-nonene-(3) is already known (J. Chem. Soc. 1956 (1809–1812)) but could previously only be obtained by complicated multi-stage synthesis methods. The process according to the invention has the advantage of producing the required reaction product in a simple manner by a single stage reaction from inexpensive starting materials.

Cis- and trans-2-oxo-3,4-benzo-bicyclo-[3,3,1]-nonene-(3)-carboxylic acid-8 have not previously been known. Their preparation by the process according to the invention is particularly surprising since it is known that when $\Delta^4$-tetrahydrophthalic acid anhydride is reacted with benzene in a Friedel-Krafts reaction, it yields 4- and 5-phenyl-1,2,3,4,5,6-hexahydro-benzophenone-carboxylic acids-(2) (Ber. 98, 1270, 1271 (1965).

Another advantage of the process according to the invention is that hydrogen fluoride and benzene can easily be removed from the reaction product and used again.

The starting materials for the process according to the invention are already known. Both cis- and trans-$\Delta^4$-tetrahydrophthalic acid anhydride and their mixtures may be used as starting material, the product being in all cases a mixture of cis- and trans-2-oxo-3,4-benzo-bicyclo-[3,3,1]-nonene-(3)-carboxylic acid-8.

The compounds obtainable by the process according to the invention are capable of various reactions on account of their carbonyl and, in some cases, carboxyl function. They may therefore be used as solvents or perfumes either as such or after esterification of the carboxyl group. In the same way as other aromatic-aliphatic ketones, e.g., acetophenone or tetralone, they may be used as intermediate products for the manufacture of medicaments, e.g., anticoagulants and narcotics, or for the manufacture or pesticides, e.g., rodenticides.

EXAMPLE 1

76 g (0.5 mol) of $\Delta^4$-tetrahydrophthalic acid anhydride, 180 ml (2 mol) of benzene and 100 ml (5 mol) of hydrogen fluoride were stirred in a 0.7 litre refined steel autoclave at 150°C for 5 hours under the pressure developed by the mixture. After termination of the reaction, the hydrogen fluoride was distilled off and the residue stirred up with water. A brown, non-homogeneous product was separated. This was stirred up with benzene and the resulting crystallisate was suction filtered. The mother liquor which contained benzene was washed, dried clarified and concentrated by evaporation. When it was left to stand, another portion of crystalline reaction product precipitated, 42.7 g (37.2 % of the theory), of cis-2-oxo-3,4-benzo-bicyclo-[3,3,1]-nonene-(3)-carboxylic acid-8 were obtained. Melting point: 203°–205°C (after crystallisation from dilute acetic acid).
Analysis: Found: C 72.6; 72.8% H 6.1% O 21.1%
$C_{14}H_{14}O_3$ Calculated: C 73.1% H 6.1% O 20.8%

EXAMPLE 2

76 g (0.5 mol) of $\Delta^4$-tetrahydrophthalic acid anhydride, 360 ml (4 mol) of benzene and 100 ml (5 mol) of hydrogen fluoride were stirred at 150°C for 5 hours. The reaction mixture was worked up as described in Example 1. This process was repeated 3 times with the same starting materials. The benzene-containing mother liquors from the four batches were combined and the solvent completely removed by evaporation. The oily residue was taken up with a mixture of 1 l of water and 100 ml of 45% sodium hydroxide solution. The undissolved residue was extracted with ether and discarded. Excess sodium chloride was added to the hot alkaline solution to precipitate the sodium salt of 4-phenyl-hexahydrophthalic acid which was formed as by-product, and the precipitate was suction filtered while hot. When the alkaline mother liquor which was stirred in the cold was triturated, the sodium salt of trans-2-oxo-3,4-benzo-bicyclo-[3,3,1]-nonene-(3-carboxylic acid-8 precipitated. The acid was liberated from this salt by treatment with hydrochloric acid.

140 g (30.4% of the theory) of cis-2-oxo-3,4-benzo-bicyclo-[3,3,1]-nonene-(3)-carboxylic acid-8 were obtained. Melting point: 203° to 205°C. In addition, 107 g (23.2% of the theory) of trans-2-oxo-3,4-benzo-bicyclo-[3,3,1]-nonene-(3) carboxylic acid-8 were obtained. Melting point: 123° to 125°C (after crystallisation from dilute acetic acid).
Analysis: Found: C 71.0; 71.3% H 6.4; 6.5% O 20.9; 21.0%
$C_{14}H_{14}O_3$ Calculated: C 73.1% H 6.1% O 20.8%

EXAMPLE 3

68 g (0.5 mol) of $\Delta^3$-cyclohexene carboxylic acid, 180 ml (2 mol) of benzene and 100 ml (5 mol) of hydrogen fluoride were heated to 100°C for 3 hours. The hydrogen fluoride was drawn off after the reaction had been terminated, and the residue was then taken up with soda solution. The organic layer was separated and the aqueous phase extracted several times with ether. The organic phases were combined, washed, dried and distilled. 21 g (23% of the theory) of 2-oxo-3,4-benzo-bicyclo-[3,3,1]-nonene-(3) were obtained. Boiling point: 101° to 104°C/0.1 mm Hg; $n^{20} = 1.5779$.
Analysis: Found C 84.0, 84.1% H 7.7; 7.8% O 8.5%
$C_{13}H_{14}O$ calculated: C 83.9% H 7.5% O 8.6%

About 60% of the theoretical amount of 4-phenyl-cyclohexane carboxylic acid was obtained by acidifying the solution which had been made alkaline with soda.

EXAMPLE 4

68 g (0.5 mol) of cyclohexene-(3)-carboxylic acid-(1), 180 ml (2 mol) of benzene and 100 ml of hydrogen fluoride were heated to 150°C in an autoclave for 3 hours. The product was then processed as described in Example 3. 20.3 g (21.8% of the theory) of 2-oxo-3,4-benzo-bicyclo-[3,3,1]-nonene-(3) and 59 g (55% of the theory) of 4-phenyl-cyclohexane carboxylic acid were obtained.

What is claimed is:

1. Process for preparing 2-oxo-3,4-benzo-bicyclo-[3,3,1]-nonene-(3) and cis- and trans-2-oxo-3,4-benzo-bicyclo-[3,3,1]-nonene-(3)-carboxylic acid-8 which comprises reacting $\Delta^3$-cyclohexene-carboxylic acid acid of $\Delta^4$-tetrahydrophthalic acid anhydride at elevated temperature with benzene and hydrogen fluoride.

2. Process of claim 1 carried out at a temperature of between 75° and 200°C.

3. A process of claim 1 wherein $\Delta^3$-cyclohexene-carboxylic acid is reacted with benzene and hydrogen fluoride at a temperature of from 100° to 150°C.

4. Process of claim 1 wherein benzene is used in excess of the stoichiometrically required quantity.

5. Process of claim 1 wherein hydrogen fluoride is used in an excess of up to 50 mols. based on the starting material used in a less than equivalent quantity.

6. Process of claim 1 carried out in the presence of an aprotic solvent.

7. Process of claim 7 wherein the aprotic solvent is nitrobenzene or a chlorinated hydrocarbon.

8. Process of claim 1 carried out in a closed vessel under the pressure developed in the reaction.

9. Cis-2-oxo-3,4-benzo-bicyclo-[3,3,1]-nonene-(3)-carboxylic acid-8.

10. Trans-2-oxo-3,4-benzo-bicyclo-[3,3,1]-nonene-(3)-carboxylic acid-8.

11. Process for preparing cis- and trans-2-oxo-3,4-benzo-bicyclo-[3,3,1]-nonene-(3)-carboxylic acid-8 which comprises reacting $\Delta^4$-tetrahydrophthalic acid anhydride at elevated temperature with benzene and hydrogen fluoride.

12. Process of claim 11 carried out at a temperature of between 75° and 200°C.

13. A process of claim 11 wherein $\Delta^4$-tetrahydrophthalic acid anhydride is reacted with benzene and hydrogen fluoride at a temperature of from 130° to 160°C.

14. Process of claim 11 wherein benzene is used in excess of the stoichiometrically required quantity.

15. Process of claim 11 wherein hydrogen fluoride is used in an excess of up to 50 mols. based on the starting material used in a less than equivalent quantity.

16. Process of claim 11 carried out in the presence of an aprotic solvent.

17. Process of claim 16 wherein the aprotic solvent is notrobenzene or a chlorinated hydrocarbon.

18. Process of claim 11 carried out in a closed vessel under the pressure developed in the reaction.

* * * * *

UNITED STATES PATENT OFFICE
CERTIFICATE OF CORRECTION

PATENT NO. : 3,880,917
DATED : April 29, 1975
INVENTOR(S) : Adolf Winkler

It is certified that error appears in the above-identified patent and that said Letters Patent are hereby corrected as shown below:

Col. 2, lines 21-38 should read as follows:

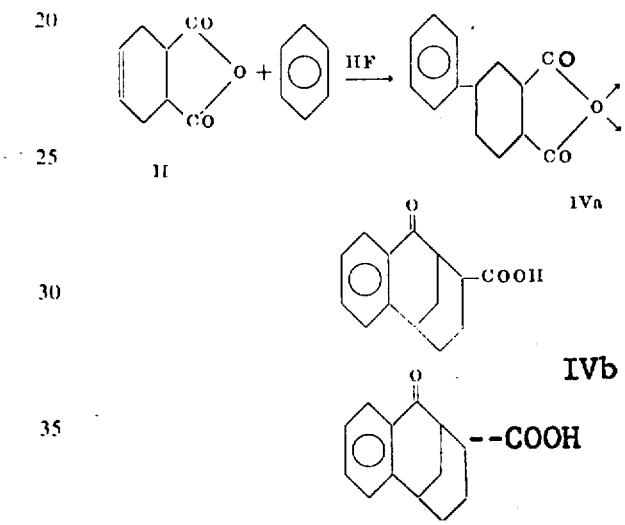

Signed and Sealed this thirtieth Day of September 1975

[SEAL]

Attest:

RUTH C. MASON
Attesting Officer

C. MARSHALL DANN
Commissioner of Patents and Trademarks